(12) United States Patent
Bernard

(10) Patent No.: US 9,032,694 B2
(45) Date of Patent: May 19, 2015

(54) WS3

(76) Inventor: John Bernard, Vero Beach, FL (US)

( * ) Notice: Subject to any disclaimer, the term of this patent is extended or adjusted under 35 U.S.C. 154(b) by 0 days.

(21) Appl. No.: 13/506,606

(22) Filed: May 2, 2012

(65) Prior Publication Data

US 2013/0295404 A1    Nov. 7, 2013

(51) Int. Cl.
*E04C 3/00* (2006.01)
*B32B 3/04* (2006.01)

(52) U.S. Cl.
CPC ............ *B32B 3/04* (2013.01); *Y10T 428/12354* (2015.01); *Y10T 428/24008* (2015.01)

(58) Field of Classification Search
USPC ......... 52/831, 834, 835, 842–845; 138/118.1; 256/1, 19, 21
See application file for complete search history.

(56) References Cited

U.S. PATENT DOCUMENTS

| | | | | |
|---|---|---|---|---|
| D300,566 S * | 4/1989 | Fein | ............................ | D25/124 |
| 4,843,793 A * | 7/1989 | Ayers | ........................ | 52/169.12 |
| 5,778,626 A * | 7/1998 | Hellsten | ........................... | 52/844 |
| 5,791,115 A * | 8/1998 | Nicolai et al. | .................. | 52/843 |
| 5,899,239 A * | 5/1999 | Coulis | ............................ | 138/163 |
| 6,286,281 B1 * | 9/2001 | Johnson | ........................ | 52/592.1 |
| 6,308,464 B1 * | 10/2001 | Demartini | ......................... | 52/16 |
| 7,168,220 B2 * | 1/2007 | Owoc et al. | ..................... | 52/844 |
| 7,442,875 B2 * | 10/2008 | Burdy et al. | .................... | 174/93 |
| 7,647,737 B2 * | 1/2010 | Morello | .......................... | 52/245 |
| 7,997,044 B2 * | 8/2011 | Green et al. | .................... | 52/834 |
| 8,074,424 B2 * | 12/2011 | Waters et al. | .................. | 52/834 |
| 2005/0271467 A1 * | 12/2005 | Ong | ........................... | 403/359.1 |

* cited by examiner

*Primary Examiner* — Beth Stephan
(74) *Attorney, Agent, or Firm* — Stephen C. Thomas

(57) ABSTRACT

The WS3 is made of a strong rust resistant metal, or other material that is rust resistant and strong enough to withstand the abuse of a weed-eater line striking it. The WS3 is comprised of the above material, that is cut into a number of side pieces. The number of side pieces is to be determined by the particular wooden post in question. These side pieces are designed to connect to each other, at the edge of each side piece there is a fold that is folded in the opposite direction of the adjacent side that it is to be connected with. These opposite folds connect each side together with the next side, eliminated the need for screws or nails to hold WS3 together as one complete solid unit surrounding a wooden post.

8 Claims, 1 Drawing Sheet

WS3

BACKGROUND

For years there have been mail box posts in front of houses. Since the invention of the weedeater in around 1972, the wooden mailbox post has been getting whipped up by the plastic weedeater line. The grass grows next to the mailbox post and when the weedeater trims the grass around the post it can't help but strike the post with the weedeater line. This causes the post to get chewed up, and whipped away. The Protective Post Covering is designed to eliminate this problem.

SUMMARY OF THE INVENTION

The covering is designed as a strong series of interlocking side pieces that have folds in the opposite direction of each other. Each fold connects together with the next fold on the next side, so on and so on, until the covering is one complete rectangular unit surrounding a wooden post, protecting it from weedeater damage. The Protective Post Covering may comprise any material that is rust resistant and is strong enough to withstand a weedeater's line striking it. The Protective Post Covering may comprise galvanized sheet metal, for example. The Protective Post Covering is held together by interlocking folds without the need for screw, nails or other attachment means for holding the covering in place surrounding and protecting a wood post.

DETAILED DESCRIPTION OF INVENTION

Figure 1:
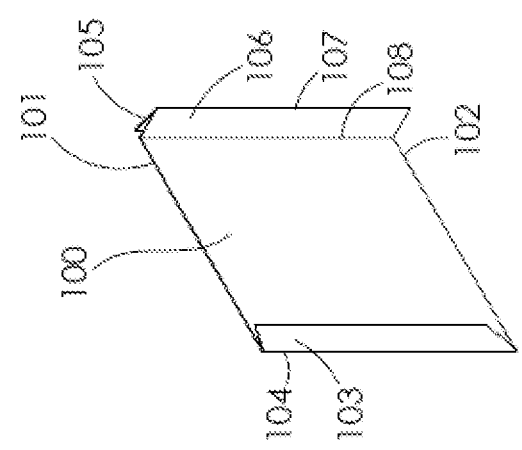
FIG. 1 shows a plate of the covering useable with other plates.

Referring now to FIG. 1, a first embodiment of a plate of the invention is depicted in which a single-sided embodiment of a plate of the invention is depicted. The first embodiment of a plate of the invention has a first edge having a first fold 103 created by a first fold line 104 forming a first V-section, a side 100 having a side top edge 101 and a side bottom edge 102, and a second edge opposing the first edge, the second edge having a second fold 106 created by a second fold line 108 and a third fold 105 created by a third fold line 107 forming a second V-section, wherein said second V-section is at approximately a right angle to side 100.

Figure 2:
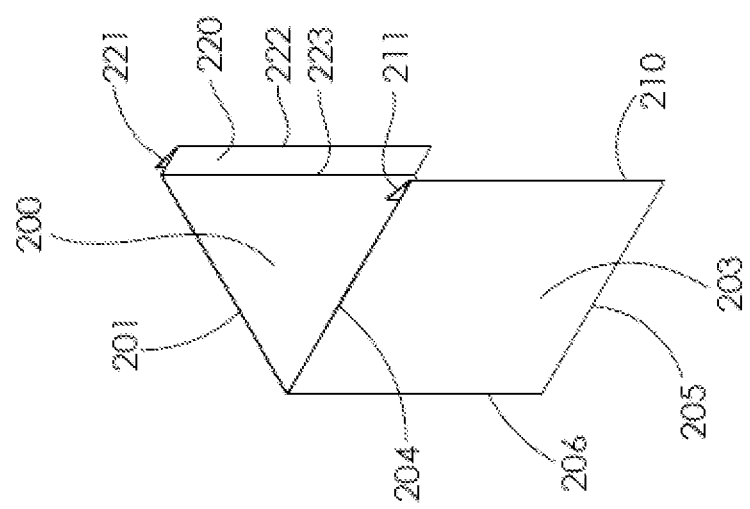
FIG. 2 shows a plate of the covering having a fold useable with other plates.

Referring now to FIG. 2, a second embodiment of a plate of the invention is depicted in which a two-sided embodiment of a plate of the invention is depicted. The second embodiment of a plate of the invention has a first edge having a first fold 211 created by a first fold line 210 forming a first V-section, a first side 203 having a side top edge 204 and a side bottom edge 205 and a second side 200 having a side top edge 201, with the first side and second side 200 being formed by fold line 206, and a second edge opposing the first edge, the second edge having a second fold 220 created by a second fold line 223 and a third fold 221 created a third fold line 222 forming a second V-section, wherein said second V-section is at approximately right angle to the second side 200.

Figure 3:
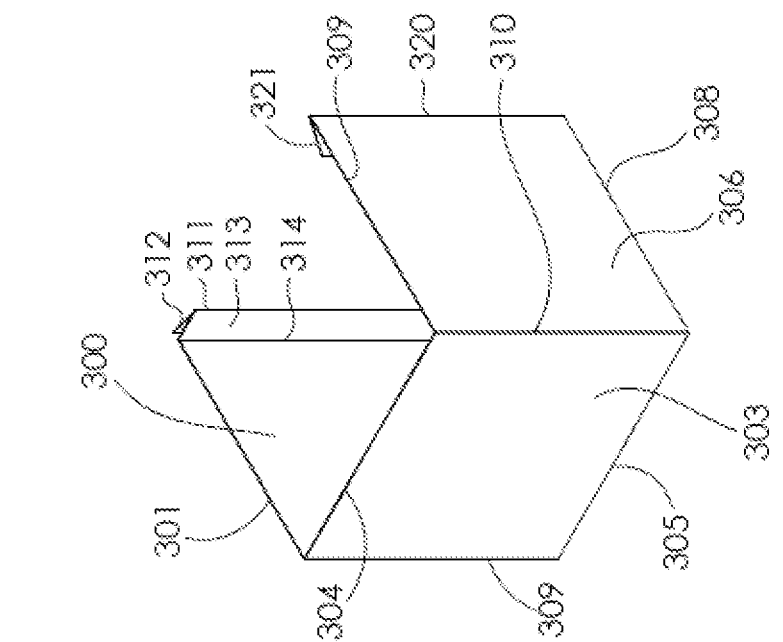
FIG. 3 shows a plate of the covering having two folds useable with other plates.

Referring now to FIG. 3, a third embodiment of a plate of the invention is depicted in which a three-sided embodiment of a plate of the invention is depicted. The third embodiment of a plate of the invention has a first edge having a first fold 321 created by a first fold line 320 forming a first V-section; a first side 306 having a side top edge 309 and a side bottom edge 308, a second side 303 having a side top edge 304 and a side bottom edge 305, with the first side 306 and second side 303 being formed by fold line 310, a third side 300 having a top edge 301 and a bottom edge 302 with the second side 303 and the third side 300 being formed by a fold line 309; and a second edge opposing the first edge, the second edge having a second fold 313 formed by a fold line 314 and a third fold 312 formed by a fold line 311, forming a second V-section, wherein said second V-section is at approximately a right angle to third side 300.

Referring now to FIGS. 1, 2 and 3, a four-sided post covering of the invention may be assembled by assembling together four of the single-sided first embodiments; one of the two-sided second embodiment and two of the single-sided first embodiments; two of the two sided second embodiments; or one of the three-sided third embodiment and one of the single-sided first embodiment. In each case, the various embodiments are assembled together by inserting the first V-section of an embodiment with the second V-section of the adjoining embodiment to form a releasable engagement between the embodiments. In any of the embodiments of the invention, the first V-section of each embodiment of a plate of the invention may be inserted into the second V-section of the adjoining embodiment of a plate of the invention to form a releasable engagement between the embodiments of the plates, forming a post covering having an enclosed shape and an open top and an open bottom. The enclosed shape may be rectangular or square in cross section.

The invention claimed is:

1. A protective covering for a post, comprising;
   a plurality of plates each having a first edge and an opposing second edge,
   wherein said first edge of each of said plates is folded along a first fold line forming a first V-section, and
   wherein said second edge of each of said plates comprises a second V-section formed by said second edge folded along a second fold line and a third fold line, wherein said second V-section is oriented at a substantially right angle to said plate; and
   wherein said first V-section of each of said plurality of plates is inserted within said second V-section of an another of the plurality of plates forming a plurality releasable engagements between the adjacent plates, such that said plurality of plates are releasably connected by said releasable engagements, the plurality of releasably engaged plates together forming an enclosed shape having an open top and an open bottom.

2. The protective covering for a post as in claim 1, wherein said plurality of plates comprise four plates and wherein said enclosed shape is a rectangle.

3. The protective covering for a post as in claim 1, wherein: said plurality of plates comprise a first plate, a second plate and a third plate, wherein the first plate is one-sided, the second plate is one-sided, and the third plate is folded along a fourth fold line creating a first side and a second side of said third plate, said first side and said second side forming an angle therebetween; and
   wherein said first V-section of said first plate is inserted into said second V-section of said second plate forming a releasable engagement, said first V-section of said second plate is inserted within said second V-section of said third folded plate forming a releasable engagement, and said first V-section of said third folded plate is inserted into said second V-section of said first plate forming a releasable engagement, the plurality of releasably engaged plates forming an enclosed shape having an open top and an open bottom.

4. The protective covering for a post as in claim 3, wherein said enclosed shape is a rectangle.

5. The protective covering for a post as in claim 1, wherein said plurality of plates comprise a first plate and a second plate, wherein each of said first plate and said second plate are folded along a fourth fold line creating a first side and a second side of said plate, said first side and said second side forming an angle therebetween; and wherein said first V-section of said first plate is inserted into said second V-section of said second plate forming a releasable engagement, and said second V-section of said first plate is inserted into said first V-section of said second plate forming a releasable engagement, the plurality of releasably engaged plates forming an enclosed shape having an open top and an open bottom.

6. The protective covering for a post as in claim 5, wherein said enclosed shape is a rectangle.

7. The protective covering for a post as in claim 1, wherein said plurality of plates comprise a first plate and a second plate, wherein said second plate is folded along a fourth fold line and a fifth fold line creating a first side, a second side and a third side of said plate, forming a right angle between said first side and said second side and forming a right angle between said second side and said third side; and wherein said first V-section of said first plate is inserted into said second V-section of said second plate forming a releasable engagement, and said first V-section of said second plate is inserted into said second V-section of said first plate forming a releasable engagement, the plurality of releasably engaged plates forming an enclosed shape having an open top and an open bottom.

8. The protective covering for a post as in claim 7, wherein said enclosed shape is a rectangle.

* * * * *